United States Patent
Zahir et al.

(10) Patent No.: US 9,428,887 B2
(45) Date of Patent: Aug. 30, 2016

(54) FLUSHING WATER CONTAINER SYSTEM FOR FLUSHING WATER OF A MOBILE TOILET

(75) Inventors: Tariq Zahir, Hamburg (DE); Tobias Wendt, Hamburg (DE); Detlev Both, Schenefeld (DE)

(73) Assignee: EVAC GmbH, Wedel (DE)

( * ) Notice: Subject to any disclaimer, the term of this patent is extended or adjusted under 35 U.S.C. 154(b) by 877 days.

(21) Appl. No.: 13/576,981

(22) PCT Filed: Feb. 4, 2011

(86) PCT No.: PCT/EP2011/051692
§ 371 (c)(1),
(2), (4) Date: Oct. 25, 2012

(87) PCT Pub. No.: WO2011/095611
PCT Pub. Date: Aug. 11, 2011

(65) Prior Publication Data
US 2013/0036539 A1  Feb. 14, 2013

(30) Foreign Application Priority Data
Feb. 5, 2010  (DE) .................. 10 2010 007 115

(51) Int. Cl.
*E03D 9/02* (2006.01)
*A47K 4/00* (2006.01)
(Continued)

(52) U.S. Cl.
CPC .............. *E03B 7/074* (2013.01); *E03B 1/042* (2013.01); *E03B 2001/045* (2013.01)

(58) Field of Classification Search
CPC .... B01D 29/92; B01D 33/722; B01D 35/16; C02F 2103/002; C02F 2103/008; E03B 1/04; E03B 1/041; E03B 1/042; E03B 1/044; E03B 2001/045; E03C 1/26; E03D 5/003; E03D 5/006

USPC ............ 210/209, 416.3; 4/224, 226.1, 227.1, 4/227.6, 317, 415, 431, 432, 665
See application file for complete search history.

(56) References Cited

U.S. PATENT DOCUMENTS 4,284,500 A * 8/1981 Keck .................. B01D 29/15
  209/250
4,303,376 A * 12/1981 Siekmann ......... A61M 5/14224
  417/360

(Continued)

FOREIGN PATENT DOCUMENTS

CA      2285808 A1    4/2001
CN    200971529 Y   11/2007
(Continued)

OTHER PUBLICATIONS

International Search Report dated May 3, 2011 in Application No. PCT/EP2011/051692.

(Continued)

*Primary Examiner* — Paul R Durand
*Assistant Examiner* — Nicholas Ros
(74) *Attorney, Agent, or Firm* — Kilpatrick Townsend & Stockton LLP; Dean W. Russell

(57) ABSTRACT

A flush water container system for the flush water of a mobile toilet (11), in particular of a mobile vacuum toilet (11), comprising
  a flush water container (43) having a flush water container inflow (44),
  characterized in that the flush water container (43) is designed to receive gray water from a washbasin (10), which in particular is a wash hand basin or a shower washbasin, and
  a metering device (41) is provided, which is in fluidic communication with the flush water container (43) and is designed to treat the gray water by feeding a descaling and/or bactericidal treatment agent,
wherein the flush water container (43) is designed to release the treated gray water as flush water to the mobile toilet (11).

10 Claims, 3 Drawing Sheets

(51) Int. Cl.
*E03B 7/07* (2006.01)
*E03B 1/04* (2006.01)

(56) References Cited

U.S. PATENT DOCUMENTS

| | | | | |
|---|---|---|---|---|
| 5,035,011 A | * | 7/1991 | Rozenblatt | B64D 11/02 4/316 |
| 5,106,493 A | * | 4/1992 | McIntosh | C02F 1/76 210/100 |
| 5,147,532 A | * | 9/1992 | Leek, Jr. | C02F 1/325 210/136 |
| 5,520,805 A | | 5/1996 | Majola | |
| 5,611,465 A | * | 3/1997 | Lee | E03D 9/005 222/214 |
| 5,692,250 A | | 12/1997 | Oldfelt et al. | |
| 5,937,455 A | * | 8/1999 | Donati | E03B 1/04 137/426 |
| 7,422,121 B2 | * | 9/2008 | Stadelmann | A01N 59/16 210/192 |
| 2004/0045910 A1 | * | 3/2004 | Hoffjann | B64D 11/02 210/758 |
| 2005/0015870 A1 | * | 1/2005 | Bringmann | E03D 9/031 4/225.1 |
| 2007/0102370 A1 | | 5/2007 | Hoffjann et al. | |
| 2012/0091050 A1 | * | 4/2012 | Parkinson | C02F 1/004 210/196 |

FOREIGN PATENT DOCUMENTS

| | | |
|---|---|---|
| DE | 4134272 A1 | 4/1993 |
| DE | 10044142 A1 | 6/2001 |
| DE | 10229799 A1 | 1/2004 |
| DE | 19844466 A1 | 11/2009 |
| DE | 102008023688 A1 | 11/2009 |
| EP | 1690789 A2 | 8/2006 |
| FR | 2498656 A1 | 7/1982 |
| GB | 2460144 * 11/2009 ............ B01D 35/00 |
| JP | 2003227152 | 8/2003 |
| ZA | 201205508 | 3/2013 |

OTHER PUBLICATIONS

Search Report dated Sep. 23, 2013 in corresponding Chinese Patent Application No. 201180008521.6.
First Examination Report dated Nov. 1, 2013 in corresponding Chinese Patent Application No. 201180008521.6 (and English translation).
First Examination Report dated Apr. 15, 2014 in corresponding Eurasian Patent Application No. 201290756131 (and German translation).
Japan Patent Application No. 2012-551642, Examination Report (and English translation) dated Dec. 25, 2014.
Eurasia Patent Application No. 201290756, Examination Report dated Oct. 3, 2014.
Europe Patent Application No. 11704568.2, Examination Report dated Feb. 17, 2015.
Office Action dated Oct. 6, 2010 in priority Application No. DE102010007115.3.
Examination Report dated Oct. 15, 2014 in related German Application No. 102010007115.3.

* cited by examiner

FLUSHING WATER CONTAINER SYSTEM FOR FLUSHING WATER OF A MOBILE TOILET

CROSS REFERENCE TO RELATED APPLICATIONS

This application is the U.S. national phase of International Application No. PCT/EP2011/051692 filed on Feb. 4, 2011, which application claims priority to German Patent Application No. 10 2010 007 115.3 filed on Feb. 5, 2010, the contents of both of which are incorporated herein by reference.

FIELD OF THE INVENTION

The invention relates to a flush water container system for flush water for a mobile toilet, in particular a mobile vacuum toilet, comprising a flush water container having a flush water container inflow. The invention also relates to a flush water system for a mobile toilet.

BACKGROUND OF THE INVENTION

Both stationarily installed toilets and mobile toilets in vehicles (such as rail vehicles, aircraft, watercraft, buses, etc.) are cleaned after use by flushing them with flush water. In the case of mobile toilets, a flush water container which stores the flush water necessary for flushing the toilet is provided in addition to the toilet itself. In order to install a mobile toilet, it is therefore necessary to install not only the toilet itself, but also the flush water container. Since the flush water container of a mobile toilet can only rarely be connected to and replenished by a water conduit (e.g. at a base station), it is necessary that it be dimensioned sufficiently large to provide the flushing capacity required by the mobile toilet. The amount of installation space occupied by the flush water container required for flushing is accordingly large. When fully replenished, the flush water container also has a transport weight that is accordingly large.

Mobile toilet systems are usually part of mobile washroom systems, which in addition to the toilet system, for example, have a washbasin for washing one's hands. The mobile washbasin system of the mobile washroom system likewise requires a supply of water from the flush water container storing the fresh water for washing one's hands in the washbasin. A mobile washroom system thus requires a correspondingly large amount of water in order to supply both the washbasin system and the toilet system with water. If the amount of water to be transported is to be reduced, then only relatively short operating times are possible, i.e., the store of water must be replenished at short intervals.

SUMMARY OF THE INVENTION

The object of the invention is to provide a flush water container system for a mobile toilet and a flush water system for a mobile toilet, with which the maintenance and replenishment intervals of a mobile washroom system or toilet system can be extended.

This object is achieved according to the invention by a flush water container system of the kind initially specified, in which the flush water container is designed to receive gray water from a washbasin, which more specifically is a wash hand basin or a shower washbasin, and wherein a metering device is provided which is in fluidic communication with the flush water container and designed to treat the gray water by adding a descaling and/or bactericidal treatment agent, wherein the flush water container is designed to deliver the gray water as flush water to the mobile toilet.

The flush water container system according to the invention advantageously reduces the amount of water which has to be carried, thus permitting significant reductions in weight and in the amount of space required, and extending the replenishment intervals.

European standard 12056-1 defines "gray water" as wastewater with a low pollution level and containing no fecal matter. An example of such gray water is the wastewater from a washbasin, which has been polluted by showering or by washing hands, for example. The wastewater from a washbasin contains "lime soaps", inter alia. These are calcium or magnesium salts which are insoluble in water and which are formed when soaps are used in hard, calcium-containing water.

According to the invention, gray water is used as flush water for a mobile toilet. This means that the fresh water being carried is used twice, thus allowing the replenishment intervals to be extended without having to increase the size of the fresh water tank.

However, it has been discovered that, due to chemical precipitation of calcium and magnesium salts that may be formed when using soaps in calcium-containing water, problems may arise when gray water is used in such a manner, on account of the lime soaps being deposited in solenoid valves and filter inserts. Potential consequences are that the filter inserts, flush outlets (flushing nozzles) and water valves become clogged, that bacterial growth at clogged or partly clogged places is aided, and that odor problems arise because of the bacterial growth that is promoted. Malfunctioning occurs as a result, which can lead to customer dissatisfaction and which can limit operation of the system or even lead to complete failure of the system. Regular purging and purification of the toilet system, which could counteract clogging and bacterial growth, would be time-consuming and cost-intensive.

The invention is based on the idea of using gray water from a washbasin (in particular from a wash hand basin, shower washbasin or bath washbasin or also from other sources of gray water) and to treat it by adding a descaling and/or bactericidal agent to neutralize or mitigate those properties of the gray water that cause clogging and/or which foster bacterial growth. Time-consuming and cost-intensive purging and purification of the mobile toilet system operated with gray water can thus be avoided by applying the invention. The water provided in the flush water container system can therefore be fed into the flushing cycle of the toilet without clogging or bacterial growth occurring in the flush system. The invention allows the volume of water in the fresh water and flush water container (and hence its size) to be significantly reduced in comparison with the fresh water container(s) of conventional systems, since the water is used twice—a volume of fresh water is kept in the fresh water container for the washbasin and after it has been used in the washbasin is fed as gray water to the flush water container system according to the invention. The treated gray water is used as flush water for the toilet.

In one preferred embodiment, the metering device is in fluidic communication with the flush water container inflow. In another preferred embodiment, the metering device is in fluidic communication with the flush water container. The flush water container inflow may be an inflow pipe connected to the flush water container, or an opening in the flush water container. Accordingly, the metering device according to the invention is preferably connected to the flush water container inflow pipe or to the flush water container inflow opening. The flush water container inflow pipe is preferably adapted for connection to the washbasin. The metering device connected to the flush water container inflow is designed to treat the gray water by adding the descaling and/or bactericidal agent. The descaling and/or bactericidal agent is preferably a fluid which is added to the gray water continuously or at certain time intervals and/or when certain events occur. According to the invention, the metering device can add the descaling and/or bactericidal agent to the gray water in the flush water container inflow or in the flush water container itself. Alternatively, the descaling and/or bactericidal agent may be a powder, a tablet or the like. Treating the gray water in the flush water container inflow and/or in the flush water container reduces or mitigates, according to the invention, those properties of the treated gray water which cause clogging and foster bacterial growth, so that the treated gray water is stored in the flush water container as flush water for the toilet. The amount of water to be transported for a mobile toilet or washroom system can thus be significantly reduced.

The metering device is preferably designed to add the descaling and/or bactericidal agent to the gray water regularly, in particular continuously and/or at specified time intervals. The descaling and/or bactericidal agent is preferably added at certain time intervals and for specified durations to the gray water in the flush water container inflow and/or in the flush water container. It is also preferred that the metering device be activated to add the descaling and/or bactericidal agent to the gray water when the water inlet of the washbasin is deactivated and/or the washbasin is emptied of gray water. It is further preferred that the metering device be designed to add the descaling and/or bactericidal agent to the flush water container inflow after a specified volume of gray water has passed through. The invention advantageously allows treated gray water to be provided at all times with a uniform quality that is maintained over an extended period.

The flush water container system preferably comprises a sensor for detecting an event and/or a filling level of the flush water container, and a control unit for controlling the metering device, the control unit being so designed that in response to the detected event and/or filling level, it causes the metering device to add the descaling and/or bactericidal agent to the gray water. An example of such an event is a filling level being reached or the level falling below a given filling level, said event being indicated by the sensor and preferably triggering replenishment with fresh water and thus metering of the descaling/biocidic agent. Such an embodiment is event-controlled metering. Alternatively or additionally thereto, it is preferred that metering is time-controlled, that is to say, if an event does not occur over a time (which is given or must be defined (e.g., a particular filling level is reached, or the level falls below a particular filling level), then metering is started. In this embodiment, it is preferred that metering starts with a minimum amount of fresh water, purely in order to run the metering device. The event may be the commencement or discontinuation of a fresh water supply for the washbasin, or a particular volume of fresh water delivered to the washbasin. The event may also be activation of the toilet flush, whereupon the flush water container system detects that a certain amount of treated gray water has been emptied from the flush water container. It is also preferred that the flush water container has a sensor for detecting the filling level of the flush water container. It is particularly preferred that the amount of the descaling and/or bactericidal agent to be added to the gray water is determined according to the detected filling level of the flush water container. Using one or more sensors is advantageous in that it is possible to ensure that the toilet flush is operated with uniform quality over a long period of time.

A particularly preferred embodiment is one in which the metering device has a piston for metering the descaling and/or bactericidal treatment agent. A metering device controlled by mechanical means (in particular by the piston) has the advantage that it obviates the need for an additional system element, such as an electronic control unit. This ensures that the flush water container system according to the invention can operate autonomously. Metering is preferably performed via the stroke of the piston in the metering device, the piston preferably being moved solely by the water pressure of the medium flowing through the device and by an opposing spring force, or being in fluidic communication with the water pressure and thus pressurized. On the other hand, the piston is connected to the reservoir, preferably via a nonreturn valve which prevents the medium from flowing through the device in the direction of the reservoir. A pump is preferably activated solely by upstream or downstream valves which control a flow of water through the metering device. The water pressure exerts a force on the piston that preferably presses the latter back against the spring. When the water pressure drops, in particular when the water pressure ceases due to a respective valve in the water conduit being closed, the piston is moved forward by the force of the spring. The cylinder volume is released, and the metered fluid is drawn from the reservoir (bag) by the resultant underpressure. In the next cycle, the piston is pressed back again by the pressure of the water, and the metered fluid is pressed out of the cylinder space into the flush water stream via a fluid conduit fitted with a nonreturn (duckbill) valve. In order to define the volume to be metered, an adjustment screw for increasing or decreasing the volume of the cylinder is preferably provided.

The flush water container system preferably includes a control unit for controlling the flush water container system. It is preferred that the control unit controls the inflow of water to the mobile washroom system and to the fresh water tank, an overflow valve, a pneumatic valve and/or a valve at the black water tank. More specifically, the control unit is designed to cause the fresh water tank to dispense fresh water to the flush water container when the need arises (for example if the filling level of the flush water container is below a defined level). This is advantageous in that, even in the event of insufficient treated gray water being available in the flush water container for flushing the toilet, the flushability of the toilet is assured by supplying fresh water from the fresh water tank. The flush water container system preferably comprises a filter for filtering the gray water, in particular for filtering particles out of the gray water, wherein the filter is arranged, in particular, in the flush water container inflow. The filter is preferably designed to filter smaller particles, such as flakes of skin, hair or bits of soap, out of the gray water. The filter is preferably adapted to be connected to a gray water outlet at the washbasin. It is also preferred that the filter be disposed in the gray water flow between the metering device and the flush water container inflow. The descaling and/or bactericidal agent can advantageously be added to the gray water in the region of the filter, such that the filtered gray water is treated simultaneously. The filter is preferably disposed in the flush water container inflow. In one preferred embodiment, the filter is a filter cage. The filter preferably has a filter fabric. The filter fabric is preferably bactericidal. The filter fabric preferably contains silver threads. In order to inhibit bacterial growth and the accumulation of lime soaps in the filter or filter cage, it is preferred, according to the invention, that the metering device regularly adds a fluid having descaling and bactericidal properties to the gray water stream into the filter. In the region of the water inlet, in which the filter is arranged, the gray water from the washbasin is thus filtered, and is also treated by addition of the descaling and/or bactericidal agent. It is advantageous that the gray water fed to the flush water container has already been filtered and treated and is therefore immediately available for flushing the toilet.

The flush water container system preferably includes an odor trap as well, which is arranged in the flush water container inflow. In one preferred embodiment, the odor trap is designed to be connected to the gray water outflow from the washbasin. Preferably, the gray water is thus fed initially via the odor trap, then optionally via the filter and finally to the flush water container. In one alternative embodiment, the odor trap is arranged in the flush water container inflow between the filter and the flush water container. In a preferred embodiment, the odor trap is a valve or siphon. According to the invention, odor nuisance is advantageously prevented for the user by guiding the gray water through the odor trap after it flows out of the washbasin.

The flush water container system preferably has a sensor for detecting a filling level of the flush water container for flushing the toilet, and a control unit for controlling the flush water container, the control unit being designed to cause the flush water container to receive fresh water from a fresh water supply when the detected filling level is below a predetermined threshold value. The control unit is preferably designed to control one or a plurality of inlet and/or outlet valve(s) of the flush water container. The sensor is preferably connected to a control unit. The control unit may be the control unit of the toilet and/or of the flush water container system. Depending on the filling level of the flush water container, the control unit may cause fresh water to be fed from the fresh water tank or the fresh water supply to the flush water container, in order to ensure that sufficient flush water for the toilet is provided in the flush water container.

The flush water container system preferably comprises a treatment agent connector preferably provided in the form of a bayonet-type connector on the metering device for connecting to a reservoir, and a reservoir for the treatment agent, said reservoir being provided in the form of a bag and having a matching discharge opening for connecting to the treatment agent connector. The connection between the metering device and the reservoir is designed particularly advantageously as a bayonet-type connector, which achieves a reliably tight connection with a particularly simple and fast plug-and-twist movement. The connection port between the metering device and the reservoir is so designed, in a manner essential to the invention, that the reservoir can be quickly and simply replaced, and that the metering device can be sealingly connected to the reservoir. It is also particularly advantageous when the reservoir is specifically designed as a flexible bag, since the latter takes up little space, and is flexibly arranged between other components of the flush water container system and, by adapting its outer shape, can dispense all of the treatment agent without ventilation measures being required.

It is also preferred that the metering device be arranged on a filtration device, in particular on a filtration device comprising a filter element, which is inserted into a connection line between the washbasin and the flush water container, and a collecting tank, which is designed to receive solids filtered out by the filtration device, in particular by the filtration device further comprising a flushing device which has a flushing inflow and a flushing outflow and is designed to flush solids collected in the region of the filter element into the collecting tank, wherein the flushing inflow is preferably designed and arranged with a double function as an inflow for adding a descaling and/or bactericidal treatment agent to the metering device. This development of the invention addresses and solves a specific problem that arises when re-using gray water to flush toilets. In order to allow such a combined utilization of gray water to operate reliably, it is necessary at regular intervals to remove particles which have entered the gray water, such as hair, flakes of skin, soap remnants, and the like. A solution in the form of a filter is known in this regard from DE 102 29 799 A1. However, the disadvantage of this solution is that it does not work reliably, with the result that contamination or soaping/scaling of downstream elements can be observed in the region of the vacuum toilet. This prior art filter solution also requires intensive maintenance because, depending on user behavior, it must be cleaned at short time intervals to ensure that it continues to work.

With the proposed solution according to the invention, an advantageous filter apparatus is provided and integrated. The filter apparatus is arranged in the inflow to the flush water container, and should be arranged as close as possible to the sink in order to provide the filtration effect for all the functional elements of the system that subsequently follow. The filter apparatus according to the invention provides reliable filtration of solids, and this function is provided over a long operating period by transferring the solids to a collecting tank. This transfer is effected by a flushing function, which may be performed with a descaling fluid containing a biocide. In particular, said fluid may be an identical biocide-containing descaling flushing solution that is also added to the gray water to prevent functional impairments in downstream functional units of the vacuum toilet system. In this regard, both the flushing solution used to flush the filter and the added fluid are fed via one and the same inflow in the region of the filter apparatus, as a result of which a functionally advantageous and compactly built system is provided. This design obviates the need for branch lines and valve controls for the descaling fluid containing a biocide. Deploying the flushable filters in this manner prevents specific problems associated with gray water filtering, such as bacterial growth or limescale clogging. This can be done, in particular, with time-controlled flushing of the filter with biocide-containing descaling fluid, although time-controlled and/or event-controlled metering of the biocide-containing descaling fluid for treating the gray water supplied to the flush water container can be additionally integrated in the same flush water inlet.

Another aspect of the invention relates to a flush water system for a mobile toilet, in particular a mobile vacuum toilet, comprising a flush water container system according to the invention according to any one of the preceding claims, and the mobile toilet, in particular the mobile vacuum toilet. It is preferred that the flush water system further comprises the washbasin. The embodiments and advantages of the inventive flush water container system described in the foregoing apply analogously to the inventive flush water system.

Yet another aspect of the invention relates to a method for operating a flush water container system according to the invention for a mobile toilet, in particular for a mobile vacuum toilet, comprising the steps: receiving gray water from a washbasin, treating the gray water by adding a descaling and/or bactericidal agent, and delivering the treated gray water as flush water to the mobile toilet. It is preferred that the method also comprises the step of adding the descaling and/or bactericidal agent from a metering device to a flush water container and/or flush water container inflow. It is preferred that the method also comprises the step of regular addition of the descaling and/or bactericidal agent, in particular continuously and/or at particular time intervals. It is preferred that the method further comprises the steps of detecting an event and/or a filling level of a flush water container and controlling the addition of the descaling and/or bactericidal agent in response to the detected event and/or filling level. It is preferred that the method also comprises the step of filtering the gray water, in particular filtering particles from the gray water. It is preferred that the method also comprises the steps of detecting a filling level of a flush water container for flushing the mobile toilet and for controlling the receiving of fresh water into the flush water container from a fresh water supply when the detected filling level is below a predetermined threshold value. It is preferred that the method also comprises the step of connecting the metering device to the flush water container and/or to the flush water container inflow by means of a bayonet-type connector of the metering device, which in particular is pouch-shaped.

Another aspect of the invention relates to a method for operating a flush water system of a mobile toilet, in particular of a mobile vacuum toilet, comprising a flush water container system according to any one of the preceding claims, and the mobile toilet, in particular the mobile vacuum toilet, wherein the flush water system further comprises the washbasin, in particular, and the method further comprises the steps of the method for operating a flush water container system according to the invention for a mobile toilet, in particular for a mobile vacuum toilet.

BRIEF DESCRIPTION OF THE DRAWINGS

The invention shall now be described with reference to preferred embodiments shown in the Figures, in which.

DETAILED DESCRIPTION

Figure 1:
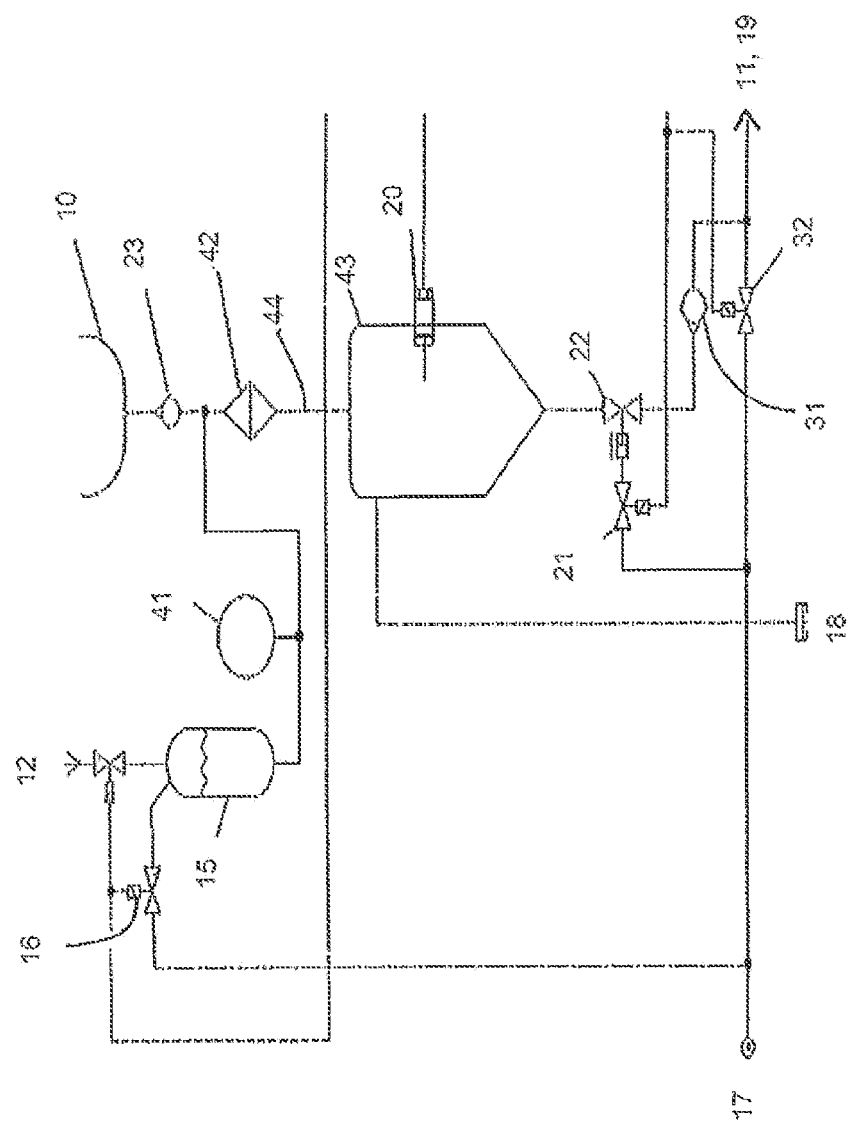
FIG. 1 shows a first embodiment of a flush water container system according to the invention.

FIG. 1 shows a first embodiment of a flush water container system for the flush water of a toilet 11, according to the invention. The flush water container system comprises a flush water container 43 having a flush water container inflow 44 for receiving gray water from a washbasin 10. The flush water container system also has a metering device 41, which is connected to flush water container 43. In the embodiment shown in FIG. 1, metering device 41 is connected to flush water container 43 via the flush water container inflow 44. In an alternative embodiment (not shown), it is also possible that metering device 41 be connected directly (i.e., not via flush water container inflow 44) to the flush water container 43. Metering device 41 is designed to treat the gray water by adding a descaling and/or bactericidal agent. In the embodiment shown in FIG. 1, metering device 41 delivers the descaling and/or bactericidal agent to the flush water container inflow 44. The flush water container 43 is designed to release the treated gray water as flush water to toilet 11.

In the embodiment shown in FIG. 1, metering device 41 is not actuated by a control unit; instead, metering is effected via the stroke of a piston (not shown) in metering device 41. The piston is moved solely by the water pressure of the medium flowing through it and by opposing spring force. The volume to be metered is determined by an adjustment screw which can reduce or increase the volume of the cylinder. A pump (likewise not shown) is activated solely by upstream or downstream valves which control a flow of water through metering device 41. A force is exerted on the piston by the pressure of the water, said force pushing the piston downward. When the water pressure drops due to a respective valve being closed, the piston is moved upward by the force of a spring. The cylinder volume is released, and the metered fluid is drawn from a reservoir (bag) by the resultant underpressure. In the next cycle, the piston is pressed back down again by the pressure of the water, and the metered fluid is pressed out of the cylinder space into the flush water stream via a duckbill valve.

The embodiment in FIG. 1 also has a water filter 42 and an odor trap 23. From washbasin 10, the gray water firstly flows through odor trap 23, than through filter 42 (where the descaling and/or bactericidal agent is added to the gray water by metering device 41, in the embodiment in FIG. 1) and subsequently into the flush water container 43.

FIG. 1 also illustrates a fresh water supply 12, which feeds water to a fresh water tank 15. The filling level of fresh water tank 15 can be detected by a sensor which is not shown in FIG. 1. Depending on the filling level of fresh water tank 15, valve 16 (which may be a solenoid valve, an electromagnetic valve or a directional control valve) can control the supply of fresh water from the fresh water supply 12. Fresh water tank 15 can provide fresh water to the flush water container 43 via the flush water container inflow 44, depending on requirements and filling level.

The filling level in flush water container 43 (also referred to as a gray water tank) is monitored by means of a filling level sensor 20. A pneumatically controlled valve 22 is disposed at the outlet of gray water tank 43. The compressed air line of compressed air source 17 is connected to valve 21 and provides the compressed air for the pneumatically controlled valve 22. Valve 32 is also disposed in the compressed air line of compressed air source 17. Depending on actuation of valves 21 and 32, valve 22 is opened and the gray water is fed from gray water tank 43 through nonreturn valve 31 to the black water tank 19 or to toilet 11. FIG. 1 also shows an overflow pipe 18, which prevents the gray water flowing back from gray water tank 43 into the flush water container inflow 44.

Wash hand basin 10 in FIG. 1 is a gray water inflow to the flush water container system according to the invention. The gray water, containing soap portions and remnants, flows from washbasin 10 into the flush water container system. Valve 23 (or also siphon 23) is used as an odor trap for dray water tank 43. Metering device 41 can add fluids having descaling and/or bactericidal properties to the gray water. In the embodiment shown in FIG. 1, a filter 42 designed as a filter cage has silver threads worked into the filter fabric, which have an inherent bactericidal effect. The gray flush water container 43 is designed to hold sufficient flush water to operate toilet 11. Sensor 22, which monitors the water level in gray water tank 43 to ensure that there is sufficient water to operate toilet 11, is also integrated in the tank.

The following provides an overview of how the flush water container system shown in FIG. 1 operates. The gray water containing soapy ingredients or soap remnants flows via odor trap 23 and through filter cage 42. Small particles such as flakes of skin, hair and soap remnants are retained in filter cage 42. Metering device 41 regularly adds a fluid with descaling and bactericidal properties to the gray water stream, in order to inhibit bacterial growth and accumulation of lime soaps in filter cage 42 and in the entire flush water container system or flush water system according to the invention. This addition of fluid may be time-controlled and/or event-controlled, according to the invention. Clogging due to chemical precipitation of lime soaps, or odor problems resulting from bacterial growth in gray water systems can be advantageously prevented by the invention.

Figure 2:
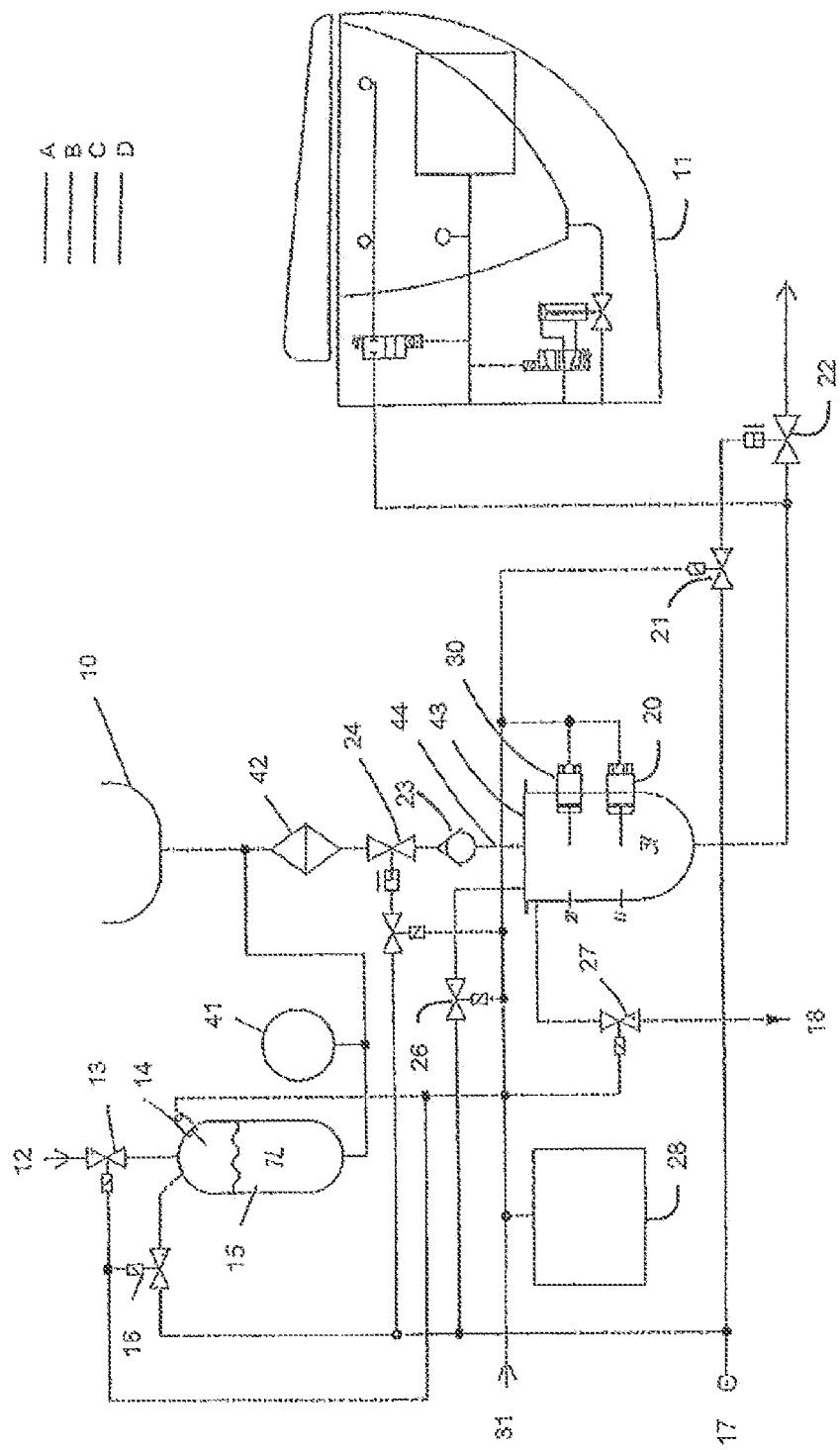
FIG. 2 shows a second embodiment of a flush water container system according to the invention.

FIG. 2 shows a second embodiment of a flush water container system according to the invention, which is part of a flush water system according to the invention. The description of FIG. 1 provided above applies analogously to units with identical reference numerals. The connections between the units shown in FIG. 2 relate to the following types of water pipelines, compressed air pipelines and power lines: "A" denotes a gray water pipeline, "B" denotes a fresh water pipeline, "C" denotes a compressed air pipeline and "D" denotes an electrical line.

FIG. 2 shows metering device 41, which is connected to flush water container 43. Flush water container 43 has a flush water container inflow 44 arranged between metering device 41 and flush water container 43. In the direction of gray water flow from washbasin 10 toward flush water container 43 are arranged, in the flush water container inflow 44, the inflow to metering device 41 then water filter 42, then a valve (solenoid valve, electromagnetic valve, directional control valve) 24 and odor trap 23. Fresh water is fed from fresh water source 12 via valve 13 to fresh water tank 15. Fresh water tank 15 is connected to the flush water container inflow 44. Fresh water tank 15 has a filling level sensor 14, which controls valve 13 according to the filling level. In the embodiment shown in FIG. 2, fresh water tank 15 has a capacity of one liter. By supplying compressed air from compressed air source 17 to valve 16, the fresh water is pressed out of fresh water tank 15, when valve 16 is open, in order to feed the water to flush water container 43.

Valve 24 is controlled by the compressed air from compressed air source 17 and allows the flush water container inflow 44 to be opened or closed. Valve 24 is controlled by valve 25, which is connected to a control unit 28. Power is supplied to control unit 28 from power source 31. Control unit 28 controls operation of valve 25 and thus the operation of compressed air valve 24, which can open the flush water container inflow 44. Control unit 28 is connected to fresh water filling level sensor 14 and controls the inflow and outflow of fresh water into and out of fresh water tank 15 via valves 13 and 16. Control unit 28 receives information from sensors 20 and 30 about the filling level of flush water container 43. Flush water container 43 has a capacity of three liters, and the filling levels of one liter and two liters are indicated to control unit 28 by sensors 20 and 30, respectively. If the filling level of flush water container 43 exceeds a predetermined level, the surplus gray water is removed via overflow pipe 18. Valve 25 is opened for that purpose by control unit 28, thus allowing the flush water to drain off to overflow drain 18.

Analogously to valve 16 of fresh water tank 15, valve 26 of flush water container 43 is actuated by control unit 28. When valve 26 is open, the increased air pressure in flush water container 43 pushes the contents out of flush water container 43.

Control unit 28 also controls valve 21, which can release the flow of compressed air to valve 22. Valve 22 opens and closes the outflow to black water tank 19. Between the outflow of flush water container 43 and valve 22, a gray water pipeline leads to toilet 11, shown schematically, which may have further valves, flushing nozzles, a control unit and the like.

Figure 3:
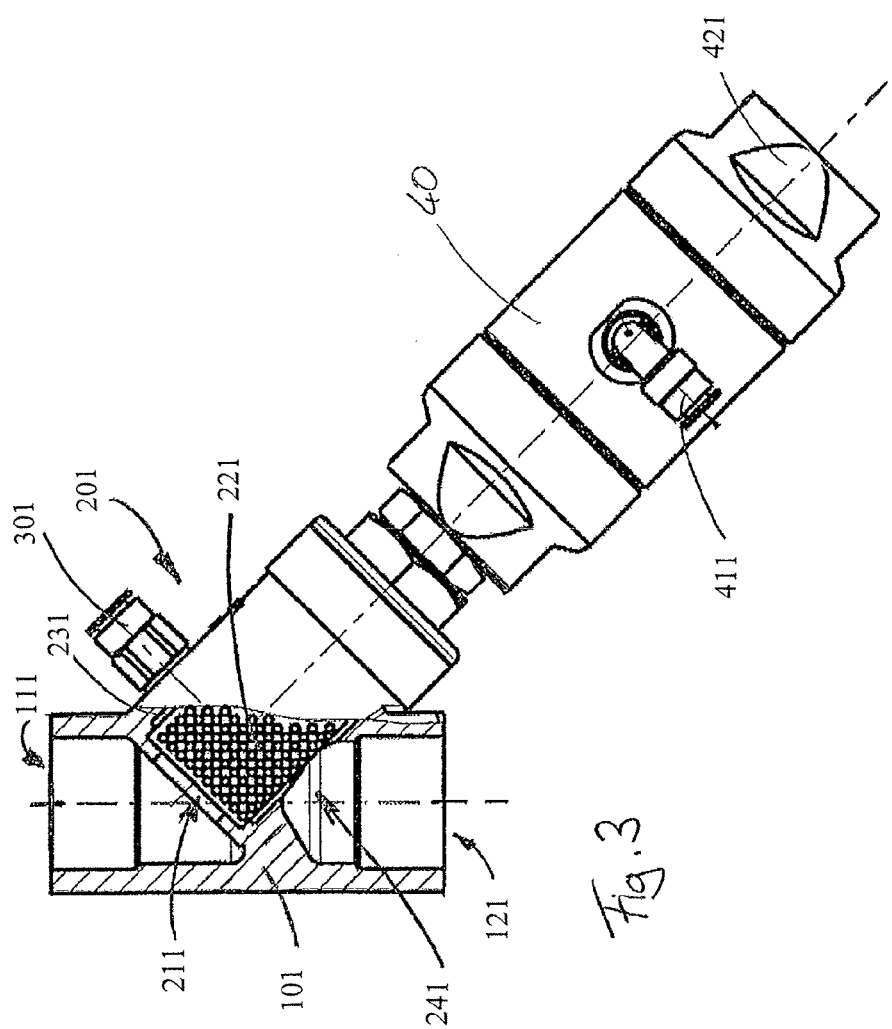
FIG. 3 shows a longitudinal cross-sectional view of a filter device according to the invention.

FIG. 3 shows a detail of a flush water container system according to the invention. What is shown is a filter device with an integrated metering device. The filter device comprises a pipe adapter 101 comprising an inflow 111 and an outflow 121, through which gray water from a sink is fed. A filtration stage 201 is arranged at adapter 101 in a downwardly slanting axial direction. Filtration stage 201 includes a central axial inflow 211, which leads into a filter cage 221. Filter cage 221 has a plurality of radially oriented orifices on its circumferential surface. Filter cage 221 is surrounded by a circumferential annular space 23, into which the gray water entering axial inlet opening 211 can enter in filtered form after passing through the filter cage. The gray water can then flow out of this annular space 231 through an outflow opening 241 in the lower part of pipe adapter 101 and finally exit through outlet opening 121.

A flush water inlet 301 is arranged in the radial direction at filtration stage 201 and opens into annular space 231 around filter cage 221. Flush water inlet 301 is therefore in direct fluidic communication with outlet opening 241 for the filtered gray water and is connected into inlet opening 211 in the filter cage by means of the orifices in filter cage 221.

A biocide-containing descaling fluid may be added via flush water inlet 301, on an event-controlled or time-controlled basis, to the gray water flowing through, in order to prevent bacterial growth and the formation of lime soaps, which could functionally impair components connected downstream from outlet opening 121.

Flush water inlet 301 is also used for reverse flushing of filter cage 221. This reverse flushing is triggered by a respective control unit at regular intervals which are larger than the intervals at which the biocide-containing descaling fluid is added to the gray water stream.

Reverse flushing of filter cage 221 involves injecting a short, intensive stream of a biocide-containing descaling fluid into annular space 231 via flush water inlet 301 and applying a pressure to filter cage 221 with a reverse flow of fluid through the filter cage. The flush water is extracted simultaneously via a flush water outflow opening 411, which is disposed at a collecting tank 40. Collecting tank 40 is axially mounted to filtration stage 201 at the end opposite inlet opening 211. At its bottom end, it has an outlet valve 421 which is designed as a pinch valve and which is used to empty the solid particles which have accumulated in collecting tank 40 from said collecting tank 40.

Filter cage 221 can thus be kept operational by regularly performing reverse flushing via openings 301, 411, and the collecting tank need only be cleaned at very long intervals by removing the solids accumulated therein via valve 421.

The invention claimed is:
1. A container system for flush water for a mobile toilet, comprising:
   a. a flush water container configured to receive gray water from a washbasin;
   b. a connection line connecting the flush water container with the washbasin;

c. a filtration stage (i) inserted into the connection line and (ii) comprising a filter element and a flush water inlet;

d. a metering device (i) in fluid communication with the flush water inlet and (ii) configured to supply at least one of a descaling agent or a bactericidal treatment agent to the gray water received from the washbasin so as to produce treated gray water releasable as flush water to the mobile toilet; and e. a collecting tank in fluid communication with the filtration stage; and in which the flush water inlet provides a flushing inflow configured to flush solids collected in the region of the filter element into the collecting tank.

2. A container system according to claim 1 in which the metering device is configured to supply at least one of a descaling agent or a bactericidal treatment agent to the gray water received from the washbasin either continuously or at specified time intervals.

3. A container system according to claim 1 further comprising a sensor and a control unit in signal communication with the sensor and in which the control unit is configured, in response to a signal received from the sensor, to cause the metering device to supply at least one of a descaling agent or a bactericidal treatment agent to the gray water received from the washbasin.

4. A container system according to claim 1 further comprising an odor trap arranged between the washbasin and the flush water container.

5. A container system according to claim 1 further comprising a minimum level sensor and a control unit in signal communication with the minimum level sensor and in which the control unit is configured, in response to a signal received from the minimum level sensor, to cause the flush water container to receive fresh water.

6. A container system according to claim 1 further comprising the mobile toilet and the washbasin.

7. A container system according to claim 1 in which the filter element comprises a filter cage having a circumferential surface with radially-oriented orifices thereon.

8. A container system according to claim 7 in which the filter element further comprises an annular space surrounding the filter cage.

9. A container system according to claim 8 in which the collecting tank comprises a flush water outflow opening.

10. A container system according to claim 9 in which the collecting tank further comprises an outlet valve for emptying solids flushed into the collecting tank.

* * * * *